C. E. MILLER.
ROLLER FOR TREATING RUBBER AND RUBBER SUBSTITUTES.
APPLICATION FILED JULY 7, 1919.
1,364,132. Patented Jan. 4, 1921.
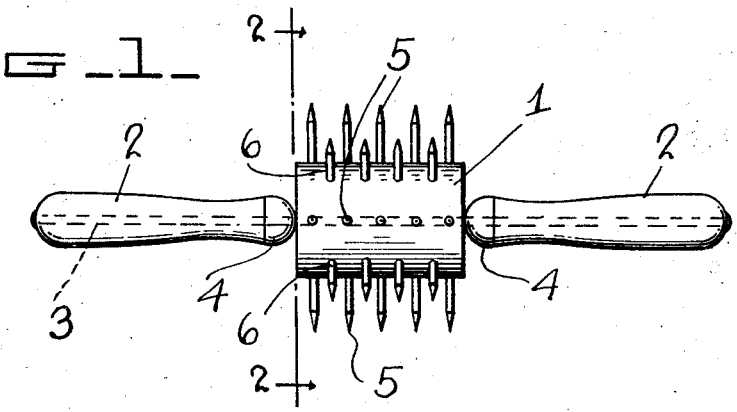
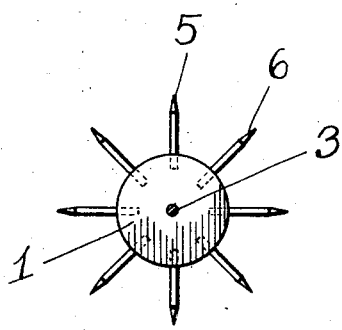
Inventor
Charles E. Miller
By John P. Duffie
Attorney

UNITED STATES PATENT OFFICE.

CHARLES E. MILLER, OF ANDERSON, INDIANA.

ROLLER FOR TREATING RUBBER AND RUBBER SUBSTITUTES.

1,364,132. Specification of Letters Patent. Patented Jan. 4, 1921.

Application filed July 7, 1919. Serial No. 308,945.

*To all whom it may concern:*

Be it known that I, CHARLES E. MILLER, a citizen of the United States, residing at Anderson, in the county of Madison and State of Indiana, have invented certain new and useful Improvements in Rollers for Treating Rubber and Rubber Substitutes, of which the following is a specification.

This invention relates to new and useful improvements in rollers for treating or working rubber or rubber substitutes while in the raw state to prevent blisters and blows or uncertain cures. This tool is especially designed for the use of the tire builder and repair man and comprises a double-handled roller provided with outwardly projecting teeth, needles, spikes or sharpened projections to stick or puncture holes in the rubber during the process of treating or working the same while in the raw state to obviate the above objections.

With the foregoing and other objects in view that will readily appear as the nature of the invention is better understood, the same consists in the novel features of construction, combination and arrangement of parts illustrated in the drawings and more particularly pointed out in the appended claims.

In the accompanying drawings:—

Figure 1 is a side elevation of a rubber treating or working roller, embodying my improvements and Fig. 2 is a vertical transverse section, taken on the plane indicated by the dotted lines 2—2 of Fig. 1, looking in the direction indicated by the arrows.

Referring to the drawings for a more particular description of the invention and which drawings are for illustrative purposes only and therefore not drawn to scale, the device comprises a cylindrical metal roller 1, preferably solid, provided at opposite ends with the oppositely extending handles 2 adapted to be grasped by the operator during the process of treating or working the rubber. The handles 2 may be carried by a spindle 3, extending longitudinally through both the roller and handles, as indicated, or may be connected with the roller in any other suitable practical manner desired. The inner ends of the handles are preferably provided with metal caps 4, the purpose of which is apparent.

In carrying out the invention, the roller 1 is provided, equi-distances apart around its circumference or outer surface, with longer and shorter rows or series of outwardly and radially projecting teeth or spikes 5 and 6, respectively. The respective rows or series of teeth 5 and 6 are disposed longitudinally of the roller and the individual teeth of each row spaced equal distances apart. It will be noted that the longer and shorter rows or series of teeth 5 and 6 not only alternate with each other, but that the teeth of the longer rows alternate with those of the shorter rows longitudinally of the roller. This arrangement of the teeth is an advantage in that it provides for a more thorough and uniform treatment of the raw rubber.

In practice, the roller is grasped by the handles 2 and passed back and forth over the rubber while in a raw state, during which operation the teeth or spikes 5 and 6 of the roller stick the rubber full of holes. It has been found from experience that by treating or working the rubber in this way, blisters or blows and uncertain cures are eliminated or overcome, the advantages of which will be apparent to those skilled in the art.

From the foregoing description taken in connection with the drawings, it is thought that the construction, operation and advantages of this invention will be readily understood without requiring a more extended explanation.

Various changes in the form, proportions and minor details of construction may be resorted to without departing from the principles or sacrificing any of the advantages of this invention as defined in the appended claims.

Having described my invention, what I claim as new and desire to secure by Letters Patent, is:—

1. A device for treating rubber and rubber substitutes in the raw state, comprising a cylindrical roller, handles for the roller and teeth projecting from the outer surface of the roller.

2. A device for treating rubber and rubber substitutes in the raw state, comprising a cylindrical double-handled roller and longitudinal rows of teeth extending outwardly and radially from the outer surface of the roller.

3. A device for treating rubber and rubber substitutes in the raw state, comprising a cylindrical metal roller, handles for the roller and longer and shorter rows of teeth projecting outwardly from the outer surface of the roller.

4. A device for treating rubber and rubber substitutes in the raw state, comprising a cylindrical roller, handles therefor and alternating longitudinally disposed longer and shorter rows of teeth extending outwardly from the outer surface of the roller, the individual teeth of the longer rows alternating with those of the shorter rows, substantially as and for the purpose specified.

In testimony whereof I affix my signature.

CHARLES E. MILLER.